United States Patent [19]

Garvey, Jr.

[11] Patent Number: 4,666,184

[45] Date of Patent: May 19, 1987

[54] SNOW SKI TRANSPORTING DEVICE

[76] Inventor: Charles C. Garvey, Jr., 7336 Hurst St., New Orleans, La. 70118

[21] Appl. No.: 644,055

[22] Filed: Aug. 23, 1984

[51] Int. Cl.⁴ ............................................. A63C 11/02
[52] U.S. Cl. .............................. 280/814; 280/47.13 R
[58] Field of Search .................. 280/47.13 R, 47.13 B, 280/814, 63, 79.1 A, 35, 639; 190/18 A

[56] References Cited

U.S. PATENT DOCUMENTS

| | | | |
|---|---|---|---|
| 1,788,150 | 1/1931 | Curtin | 280/35 |
| 3,504,921 | 4/1970 | Osmond | 280/8 |
| 3,717,357 | 2/1973 | Schaefer | 280/47.13 R |
| 3,851,689 | 12/1974 | Kohls | 150/52 R |
| 4,131,289 | 12/1978 | Maller | 280/814 |
| 4,190,182 | 2/1980 | Hickey | 224/45 S |
| 4,268,050 | 5/1981 | Kennedy | 280/38 |
| 4,269,435 | 5/1981 | Jarvenkyla | 280/814 |

FOREIGN PATENT DOCUMENTS

| | | | |
|---|---|---|---|
| 443498 | 4/1927 | Fed. Rep. of Germany | 280/814 |
| 1299186 | 12/1962 | France | 224/45 S |
| 1552202 | 1/1969 | France | 280/814 |
| 2358171 | 2/1978 | France | 280/814 |
| 2471796 | 6/1981 | France | 280/814 |
| 451775 | 5/1968 | Switzerland | 280/814 |
| 581487 | 11/1976 | Switzerland | 280/814 |

OTHER PUBLICATIONS

WO 80/01761, Sep. 4, 1980, Hinderoth.
Skirou, "Ski Flash Magazine", p. 60, 4/1983.

Primary Examiner—David M. Mitchell
Attorney, Agent, or Firm—Pravel, Gambrell, Hewitt & Kimball

[57] ABSTRACT

A transporter for carrying an assembly of left and right snow skis is provided for carrying the skis when they are placed together with the ski bottoms abutting. The apparatus includes a pair of spaced part wheel carriages, positioned during transportation on respective opposite sides of the skis, each carriage holding an axle and a rotatably mounted wheel thereon. A flexible strap secures the wheel carriages to the skis. When the skis are removed, the carriages can collapse with respect to each other, thus collapsing the wheel base for easy storage, for example, in the user's pocket.

8 Claims, 8 Drawing Figures

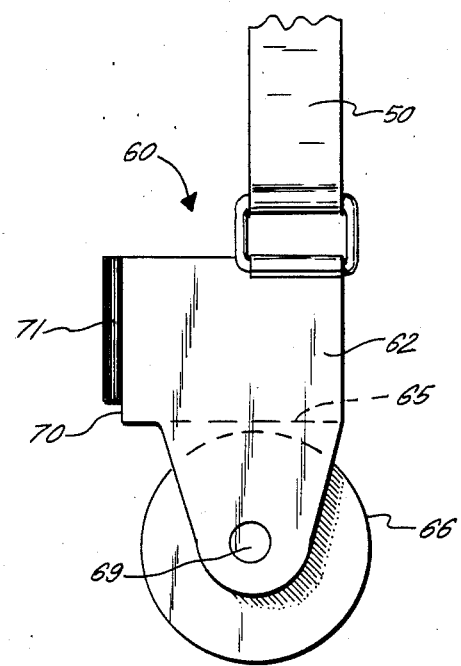
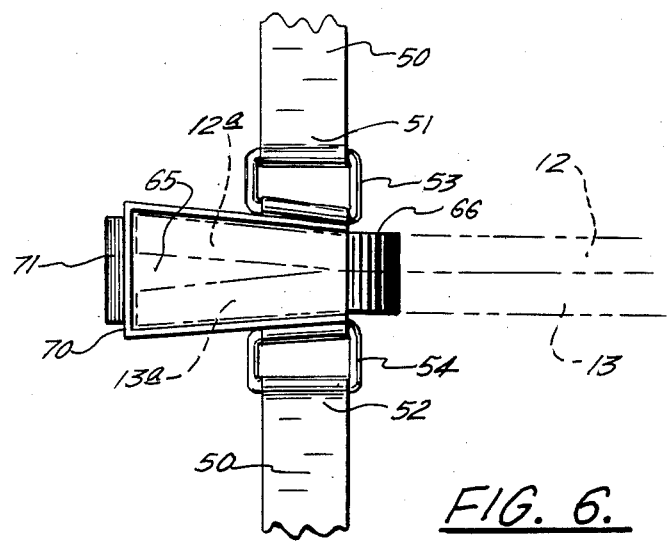
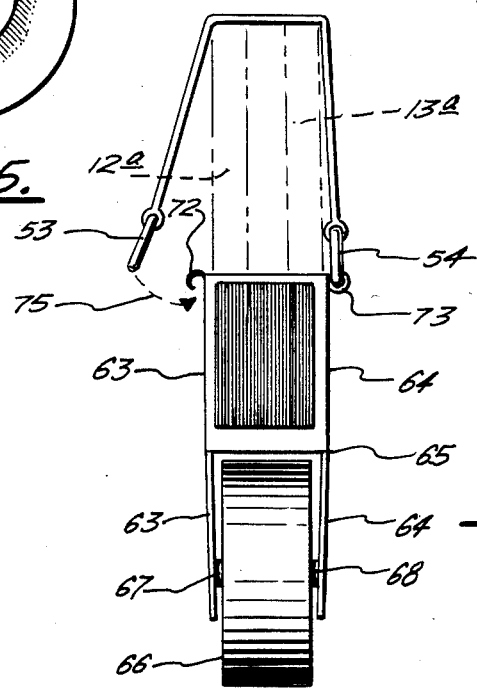
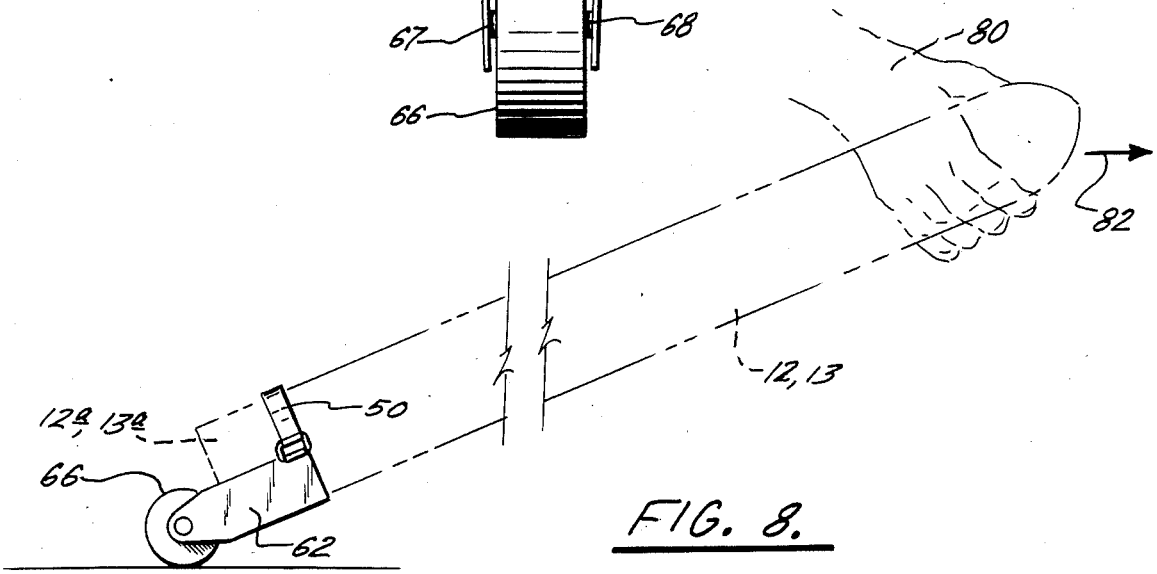
FIG. 5.
FIG. 6.
FIG. 7.
FIG. 8.

SNOW SKI TRANSPORTING DEVICE

BACKGROUND OF THE INVENTION

1. Technical Field

The present invention relates to snow ski carriers and more particularly to an improved snow ski carrier which attaches to and holds together one end portion of the skis with a collapsible wheeled assembly so that the skier can either pull or push the skis upon the wheeled assembly while transporting the skis yet disassemble and carry the apparatus in his pocket while skiing.

2. General Background

Snow skiing is a popular and exhilirating winter sport. The sport has become increasingly popular, attracting larger and larger crowds. To accommodate a large number of skiers, huge ski areas have been developed, each covering one or more mountain slopes. Ski lifts, gondolas and trams carry skiers from a "base area" to the mountain tops where they ski down the snow covered mountain slopes to the base area where they started. Large ski areas have multiple lifts and thus can accommodate thousands of skiers in a given day. The thousands of skiers require transportation to the ski area because of their usual remoteness from populated cities. Skiers travel to the ski slopes by automobile or by bus. Thus, most ski areas provide large parking lots at the base area.

Unfortunately, skiers must transport their equipment from the parking lot areas to the bottom of the ski lift. This distance is usually substantial, often as much as a quarter mile, half mile or more. The distance is usually an uphill walk because the base areas can often be on the lower side of a mountain where grades are still substantial. The distance that a skier must travel is aggravated by other factors which create sources of fatigue for the skier.

Skiers must carry to the slopes a great deal of heavy and bulky equipment that is used in skiing. Firstly, skiers wear heavy clothing to protect them from the intense cold and wind they will face on the mountain top and slopes. Secondly, the skier wears heavy confining boots which support his or her feet and ankles during skiing. Walking in these heavy, confining ski boots is quite arduous. This is due in part to their weight and in part to the fact that they immobilize the skier's ankle joint. Thirdly, the skier must carry a pair of skis and poles which are relatively heavy. The skis are also awkward to carry since they are usually about as long as the skier is tall, or slightly longer. The skis typically must be held together as a unit in order to handle them with any ease at all. This is normally done by placing the corresponding bottom surfaces of the skis together and holding them in that position while the skis are supported on the skier's shoulder or under one arm. The skier can then use his or her other hand to carry ski poles, handbags, and other such paraphernalia which is a part of the sport.

Various ski carriers have been patented which attempt to solve the above problems and thus lessen the skier's burden. Several of these devices require the skier to support the full weight of the skies.

A typical example of such a carrier can be seen in U.S. Pat. No. 4,190,182 issued to D. Hickey, entitled "Ski Carrier."

Some patents have attempted to provide rolling ski carriers. Examples are U.S. Pat. No. 4,268,050 issued to R. Kennedy entitled "Ski Accessory Transportation and Storage System," and U.S. Pat. No. 3,504,921 issued to Osmond. The Kennedy and Osmond devices are large, bulky devices resembling golf carts having bulky, expansive frames designed to carry multiple pairs of skis. These devices suffer because of their large frames and resultant and weight. They present storage problems to the skier that has reached the ski lift but has left his car or bus behind in the base area parking lot as is usually the case. Another problem with the Kennedy and Osmond devices is that when the skis are lifted, the carrier doesn't asily go with the skis. Thus, carrying the skis up or down steps or into shops and restrooms is a problem with the the abovementioned carriers.

Another ski carrier attempting to provide rollers so that the skis can be rolled over bare surfaces is the Maller device shown in U.S. Pat. No. 4,131,289 entitled "Ski Equipment Carrier." This device uses a bag-like cartainer which covers and contains the skis and poles. The bottom of the bag has a semi-oval base with small rollers. This device is too bulky to be carried in the skier's pockets after removal. Its geometry necessarily requires that the skis be plumbed almost vertically for the rollers to abut the ground for purposes of rolling, making it awkward for use by short people or children. Because of its complexity, installation and removal from the skis would be awkward and timeconsuming.

GENERAL DISCUSSION OF THE PRESENT INVENTION

The present invention provides a ski transport device having a means for holding a pair of skis with the flat sides in fixed parallel relationship to each other. At the same time, an engaging means associated with the holding means engages the skis and keeps them in a fixed position in the holding means. A wheel means is operatively connected to the holding means and adapted to engage the ground on the side of the holding means opposite the skis, the wheel means having a rolling surface which is wide enough to prevent the skis from tipping when the skis are transported. In the preferred embodiment the holding means includes in part a multi-surfaced holder which abuts two edges of the skis while the skis are positioned sideways (on edge) during transporting and first and second flanged surfaces which abut the top of each one of the skis while the skis are in the aforementioned sideways position. An engaging means associated with the holding means is provided for engaging the skis and keeping them in the fixed position. In the preferred embodiment, the engaging means includes in part a flexible elastic strap. Wheel means operatively connected to the holding means are adapted to engage the ground on the side of the holding means opposite the skis. The wheel means have a rolling surface wide enough to prevent the skis from tipping when the skis are being transported.

In the preferred embodiment, the wheel means includes a pair of spaced apart wheels which are positioned respectively on each side of the skis being transported. In the preferred embodiment, the engaging means includes a flexible elastic strap having first and second wheel carriers at its ends. The first and second wheels are respectively connected to the first and second wheel carriers so that the elastic strap secures the wheels, wheel carriers and the ski holder to the skis. With this construction, the apparatus stays on the skis when the skis are lifted for purposes of climbing steps, walking over snowbanks, passing through doorways, or loading into cars if desired.

BRIEF DESCRIPTION OF THE DRAWINGS

For a further understanding of the nature and objects of the present invention, reference should be had to the following detailed description, taken in conjunction with the accompanying drawings in which the parts are given like reference numerals and wherein:

FIG. 5 is a side view of another embodiment of the apparatus of the present invention;

FIG. 6 is a top view of the embodiment of FIG. 5;

FIG. 7 is a rear view of the embodiment of FIGS. 5 and 6; and

FIG. 8 is a schematic view illustrating another embodiment of the apparatus of the present invention shown during transportation of the skis.

DETAILED DESCRIPTION OF THE PREFERRED EMBODIMENT

Figures 1, 2:
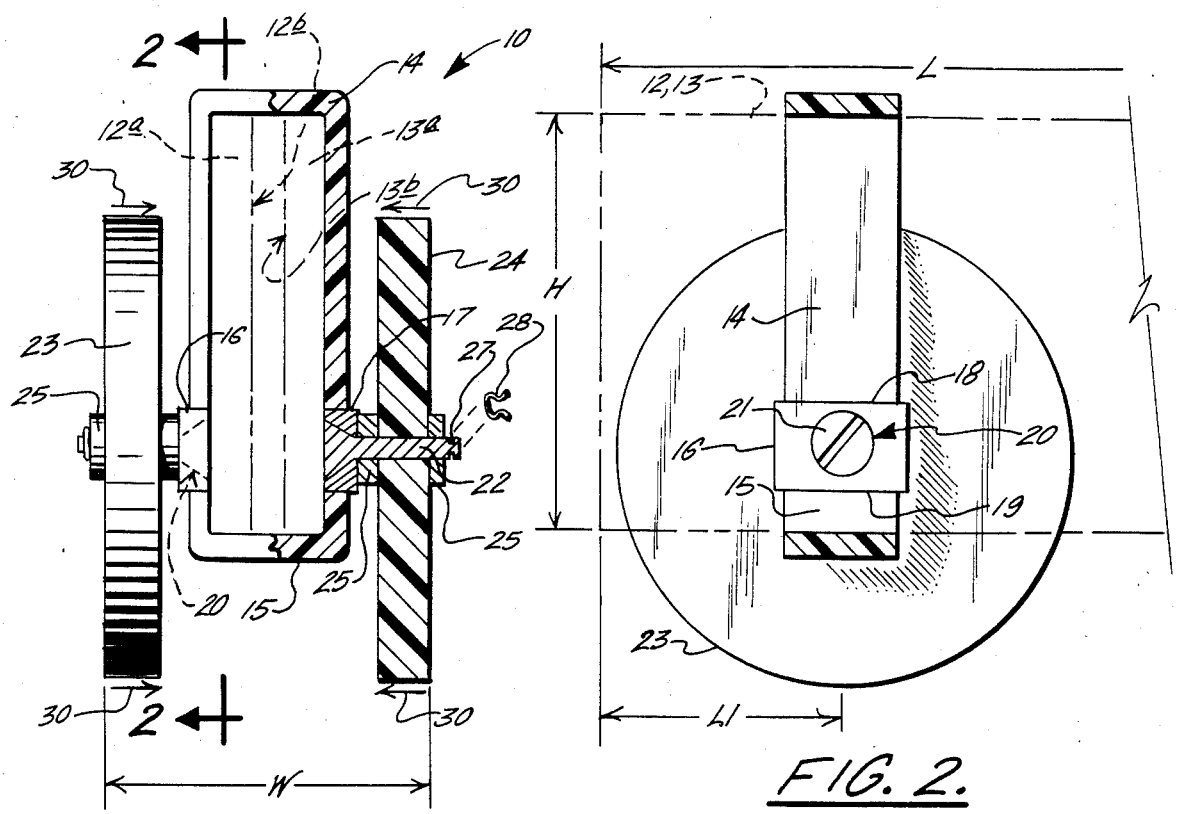
FIG. 1 is an end sectional view of the preferred embodiment of the apparatus of the present invention.
FIG. 2 is a sectional view taken along lines 2—2 of FIG. 1.
Figures 3, 4:
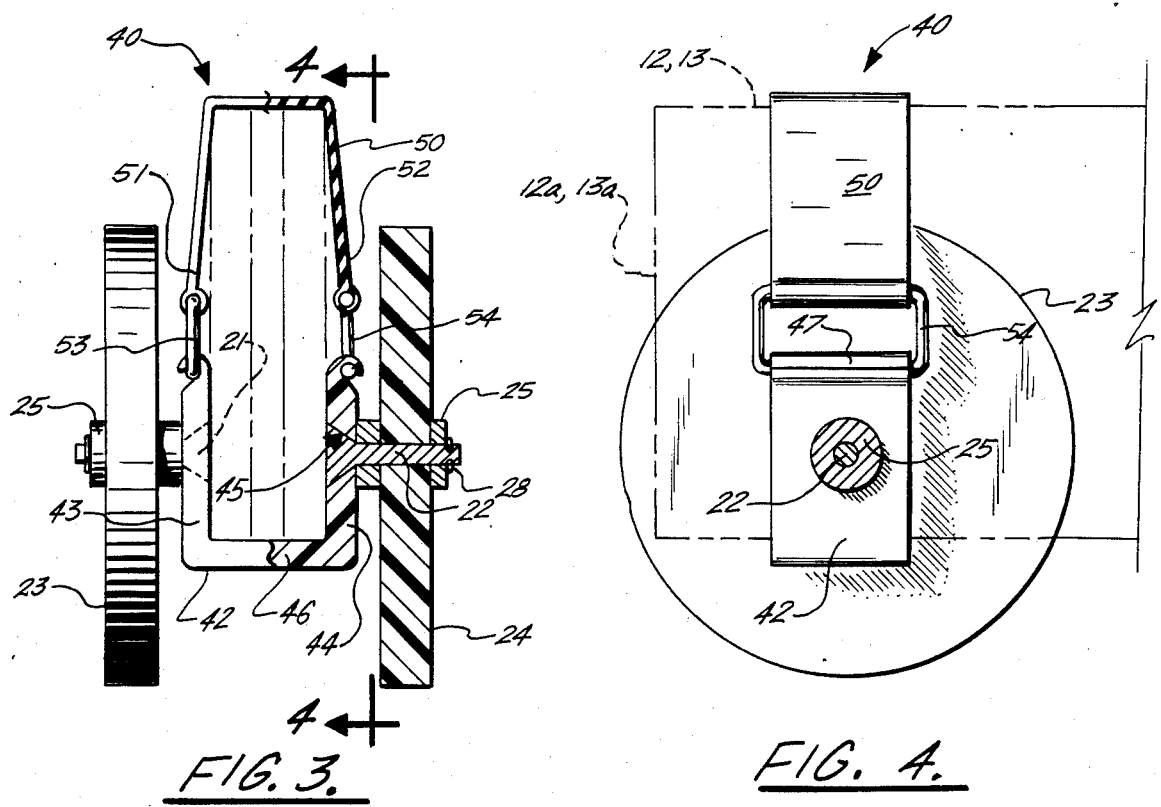
FIG. 3 is an end sectional view of an alternate embodiment of the apparatus of the present invention.
FIG. 4 is a sectional view taken along lines 4—4 of FIG. 3.

FIGS. 1-4 illustrate the preferred embodiment of the apparatus of the present invention designated generally by the numeral 10. Ski carrier 10 is used to transport a pair 12, 13 of snow skis and attaches to the tail 12a, 13a end portions of the snow skis as best shown in FIGS. 2, 4 and 9. FIGS. 1 and 2 show a first embodiment of the invention. Ski carrier 10 includes a pair of upper and lower straps 14, 15, each of which is preferably elastic such as rubber, for example.

Straps 14, 15 are bonded or otherwise connected respectively to the upper and lower sides of a pair of spaced separate wheel carriers 16, 17. Each wheel carrier 16, 17 is preferably rectangular and attaches at its upper 18 and lower 19 edges respectively to straps 14, 15. Each wheel carrier further provides a central frustro-conical opening 20 therethrough as best seen in FIG. 1. Opening 20 receives a correspondingly sized flathead type fastener 21 therethrough. Each fastener 21 includes an elongated axle 22 portion which carries a wheel during operation. In FIG. 1, a pair of spaced apart wheels 23, 24 are shown. Each wheel 23, 24 is mounted upon its respective fastener 21 and each wheel is spaced in the middle section of the fastener 21 by means of a plurality of washers 25. In the preferred embodiment, a single washer 25 is placed on each side of each wheel 23, 24. The outer distal end portion of each fastener 21 provides an annular groove 27 receptive of retainer clip 28 which would be, for example, a split ring type clip or other suitable removable type fastener. Wheels 23, 24 can be spaced a distance L1 from the end of each ski as desired. In FIG. 2, the wheels have been moved forwardly inside the rear edge of the skis so that the skis can be supported on the tails such as when leaned against a wall, for example, and without interference from the wheels.

Since the straps 14, 15 are each flexible, one skilled in the art will note that they can be stretched and expanded so that the assembly of the straps 14, 15, wheel carriers 16, 17 and wheels 23, 24 can be positioned upon and removed from the tails 12a, 13a of the skis 12, 13. Positioning the wheels 23, 24 any distance linearly along the tails 12a, 13a of the skis can be achieved by sliding the straps 14, 15 forwardly or rearwardly as desired.

The strap 15 can be made sufficiently short so that it "registers" the wheels in a balanced symmetrical position with respect to each other and with respect to the ski edges. Thus, the strap 15 could, for example, be slightly longer than the combined width of the skis when the skis are assembled together with the ski bottoms 12b, 13b placed together as in FIG. 1. The ski bottoms 12b, 13b are the "flat" sides of the skis which engage the snow during skiing. These flat ski bottom surfaces are the same shape and size for a given pair of skis in a set. It is customary for skiers to position their skis in such a bottom-to-bottom abutment after skiing in order to hand carry the skis. This aids the skier in handling the skis which are otherwise bulky, heavy and cumbersome objects to carry. Since the assembly of straps 14, 15 and carriers 16, 17 form a partially elastic member encircling the skis 12, 13, the assembly functions to: (1) hold the ski bottom together in the tail area to which the carrier 10 is attached, and (2) hold the entire carrier 10 on the skis even when they are lifted or otherwise carried. Thus, for example, a user can climb steps, enter shops or restaurants, board buses, and the like without having to assemble or disassemble the apparatus 10 from the skis. The skier can assemble the carrier 10 on the skis after leaving the ski slopes and leave it on until reaching his or her automobile, bus, lodge or the like.

Since the carrier 10 can be moved linearly with respect to the skis, it can be positioned forwardly so that the skis can be leaned against a wall with the tails of the skis providing a base which will not roll away.

The front end portion of the skis can be easily held together by the hand of the user as shown in FIG. 9, since the opposite or tail end portions 12a, 13a are held tightly together by means of the assembly of straps 14, 15 and wheel carriers 16, 17.

One of the features of the present invention is that the carrier 10 is collapsible upon removal from the skis as is illustrated in FIG. 1 by the arrows 30. The carrier 10 provides a widened wheel base of dimension W when the skis 16, 17 but can collapse upon removal from the skis decreasing the wheel base. This is because the straps 14, 15 are flexible and the wheels 23, 24 and wheel carriers 16, 17 can be moved together until the wheel carriers 16, 17 abut. This feature makes the carrier 10 quite portable in that it can be easily placed inside the pocket of the wearer after removal from the skis 12, 13. There is no need to convey the carrier 10 to a storage locker or other facility when one leaves his automobile or other mode of ground transportation and reaches the ski lift area. A skier can leave his automobile or a bus, walk directly to the ski lift, remove the carrier 10 from his skis. The carrier 10 can then be collapsed and placed inside a pocket, backpack or the like until skiing is ended.

The construction as described could be made of very lightweight material such as plastic, rubber and/or lightweight metal.

Another embodiment designated by the numeral 40 is seen in FIGS. 3 and 4. In the embodiment of FIGS. 3 and 4, a pair of wheels 23, 24 is shown which are connected to a single wheel carrier 42 which is U-shaped in cross-section. Otherwise, fasteners 21 include a frustoconical head and an elongated axle 22 portions as shown in the embodiment of FIGS. 1 and 2. A plurality of washers 25 and retainer clips 28 secure wheels 23, 24. Each fastener 21 would include an annular groove 27 at its end portion which would receive retainer clip 28 as with the embodiment of FIGS. 1 and 2. The wheel carrier 42 also functions as a carrier for skis 12, 13. The carrier 42 includes a pair of spaced apart upstanding flanges 43, 44, each of which provides a frustro-conically shaped opening 45 therethrough. Upstanding flanges 43, 44 can be integrally connected with base member 46 so that wheel carrier 42 has a uniform channel shaped or U-shaped cross-section. Flanges 43, 44 would be spaced apart a dimension which would accommodate the double thickness of conventional snow skis which is a substantially uniform dimension in the ski manufacturing industry. Any "slackness" because of differences in model or size could be compensated by the tension imparted by strap 50 which is a preferably flexible, elastic strap such as a rubber strap, for example. Strap 50 includes end portions 51, 52 which carry clips 53, 54. The uppermost edge of each flange 43, 44 provides a knurled hook 47 which cooperates with clip 54 to form a connection between strap 50 and wheel carrier 42. Retainer clips 28 are easily removable, so that wheels 23, 24 could quickly be disassembled from wheel carrier 42 for purposes of collapsing apparatus 40 for carriage in a pocket, backpack, parka or the like. The interior washers 25 could be bonded to wheel carrier 42, and the exterior washers 25 could be bonded to wheels 23, 24 if desired so that the washers 25 would not be inadvertently lost during disassembly. As with the embodiment of FIGS. 1 and 2, the apparatus 40 can be moved linearly along the skis with respect to the ski tails 12a, 13a as desired to allow the skis to be rested on their tail end portions and propped against a wall, such as is commonly done by skiers.

The embodiment of FIGS. 5-8 shows another embodiment designated generally by the numeral 60. Ski carrier 60 provides a wheel carrier 62 similar to the wheel carrier described with regard to the embodiment of FIGS. 3 and 4. Wheel carrier 62 includes a pair of spaced apart flangs 63, 64 which extend below base plate 65 so that wheel 66 can attach thereto respectively at openings 67, 68. An axle 69 passes through each flange 63, 64 and supports wheel 66. Axle 69 could be attached permanently to flanges 63, 64 by welding, for example, or could be removably attached thereto using a spring clip and annular groove as illustrated on the end portion of fastener 20 in FIG. 1. The base plate 65 forms a divider through the center portion of wheel carrier 62 and thus defines a lower surface upon which the edges of skis 12, 13 rests. A rearmost plate 70 defines the terminal end portion of wheel carrier 62 normally abutted by ski tails 12a, 13a. A rubber or like shock pad 71 can be mounted on plate 70 to aid in holding the skis when they are leaned up against a wall, for example.

Ski carrier 60 is otherwise assembled to the ski similarly with regard to the embodiment of FIGS. 3 and 4. A strap 50 is provided having a pair of end portions 51, 52 to which are attached clamps 53, 54. Each of the clamps cooperates with a knurled hook 72, 73 which cooperate with clips 53, 54 to form a releasable connection as shown by the curved dotted arrow in FIG. 7 which is designated by the numeral 75.

In the embodiment of FIGS. 5-7, the flanges 63, 64 extend transversely with respect to the longitudinal axis of the skis 12, 13 while the embodiment of FIG. 8 provides flanges which extends rearwardly or longitudinally of the skis so that the wheel 66 extends beyond the tails 12a, 13a of the skis 12, 13. In FIG. 8, the hand 80 of a user can be seen pulling the skis 12, 13 in a direction of travel which is indicated by the arrow 82. Since the tail 12a, 13a end portions of the skis are held together by means of the wheel carrier 62 and bracket 50, the hand 80 of the user can easily hold together the opposite ends or front tip end portions of the skis when the skier simultaneously grips the front of the skis and holds them together (FIG. 8). Alternately, a small belt with a buckle, for example, could be placed around both skis at the end portion opposite tails 12a, 13a to aid in holding the skis together at the forward end.

Because many varying and different embodiments may be made within the scope of the inventive concept herein taught, and because many modifications may be made in the embodiment of the law, it is to be understood that the details herein are to be interpreted as illustrative and not in a limiting sense.

What is claimed as invention is:

1. A carrier for the transportation of a pair of assembled snow skis, each ski having top and bottom surfaces and generally squared rear tail portions, with the bottom surfaces abutting, and with the tails and edges of the skis being aligned during such transportation, comprising:
   a. a pair of left and right respective wheel carriers that can be positioned forwardly of the ski tails during transportation and in a position adjacent the respective left and right ski upper surfaces;
   b. the wheel carriers including a pair of spaced apart left and right respective axles, each axle extending respectively in opposite lateral directions away from the skis during transportation; and
   c. holding means comprising at least in part a flexible strap for holding the wheels and skis in a fixed wheelbase position with respect to each other during transport;
   d. the holding means including means, forming a connection between the respective wheel carrier and axle assemblies during transport, for removing the wheel and axle assemblies from the fixed wheelbase position so that they are freely movable to collapse upon each other for compact storage after transport is completed.

2. The ski transporter of claim 1 wherein the holding means encircles the ski tails.

3. The ski transporter of claim 2 wherein the holding means includes flexible straps which extend generally above and below the wheel carriers during transport.

4. The ski transporter of claim 1 wherein the wheel carriers each provide flat surfaces that abut the upper surfaces respectively of the pair of skis being transported.

5. The ski transporter of claim 1 wherein the flexible strap forms a connection between the wheel carriers.

6. The ski transporter of claim 5 wherein the flexible strap is of a rubber construction.

7. The ski transporter of claim 1 wherein the holding means comprises at least in part a flexible rubber strap that extends at least partially around the assembled skis during transport and connects respectively to the assembly of the wheel carriers and axles.

8. The ski carrier of claim 1, wherein the holding means is a flexible strap connected to the wheel carrier at a position near the axle.

* * * * *